US008504623B2

(12) United States Patent
Santos et al.

(10) Patent No.: US 8,504,623 B2
(45) Date of Patent: Aug. 6, 2013

(54) SYSTEM AND METHOD FOR DISTRIBUTING ELECTRONIC INFORMATION

(75) Inventors: Sonia M. Santos, Overland Park, KS (US); Linda L. Vanhooser, Raymore, MO (US); Lanelle T. Chestnut, Leawood, KS (US); Jeanie L. Nice, Paola, KS (US); Sue A. Witten, Independence, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1264 days.

(21) Appl. No.: 11/977,958

(22) Filed: Oct. 26, 2007

(65) Prior Publication Data

US 2009/0113004 A1 Apr. 30, 2009

(51) Int. Cl.
  *G06F 15/16* (2006.01)
  *G06F 15/18* (2006.01)

(52) U.S. Cl.
  USPC .......... 709/206; 709/230; 709/218; 709/203; 709/229; 709/217; 707/769; 707/782; 707/770; 707/705; 707/706

(58) Field of Classification Search
  USPC .................. 709/206, 230, 218, 203, 229, 217
  See application file for complete search history.

(56) References Cited

U.S. PATENT DOCUMENTS

| | | | | |
|---|---|---|---|---|
| 6,854,007 B1* | 2/2005 | Hammond | .................... | 709/206 |
| 7,054,869 B1* | 5/2006 | Roemke et al. | ................. | 707/10 |
| 7,133,901 B1* | 11/2006 | Dalby et al. | .................. | 709/206 |
| 7,853,472 B2* | 12/2010 | Al-Abdulqader et al. | ... | 705/7.13 |
| 2002/0065890 A1* | 5/2002 | Barron | .......................... | 709/206 |
| 2003/0088824 A1* | 5/2003 | Ayan | ............................. | 715/500 |
| 2003/0167250 A1* | 9/2003 | Sash | ................................ | 707/1 |
| 2005/0195077 A1* | 9/2005 | McCulloch et al. | .......... | 340/500 |
| 2007/0016514 A1* | 1/2007 | Al-Abdulqader et al. | ...... | 705/37 |
| 2007/0118803 A1* | 5/2007 | Walker et al. | ................. | 715/744 |
| 2008/0147816 A1* | 6/2008 | Damm et al. | ................. | 709/206 |
| 2010/0010940 A1* | 1/2010 | Spyropoulos et al. | .......... | 706/12 |

* cited by examiner

*Primary Examiner* — Jude Jean Gilles
(74) *Attorney, Agent, or Firm* — Swanson & Bratschun, L.L.C.

(57) ABSTRACT

The present system for distributing electronic information includes a central email client connected to an email sending server, the central email client connected to an addressee's computer operating an addressee's email client connected to a email receiving server, the email sending server and the email receiving server utilizing a common email system protocol to send an email over the network; and a first selectable link displayed on the email, the first selectable link associated with an Internet portal containing one of a second selectable link and a first set of information categories, the second selectable link and the first set of information categories stored on an Internet server connected to the network, the second selectable link and the first set of information categories displayed to the addressee's computer when the first selectable link is selected.

17 Claims, 14 Drawing Sheets

Subject: FW: September "Meeting in a Box" for Technician Supervisors — 302
Importance: High

From: — 304
Sent:
To:
Cc:
Importance: High

---

Technician Supervisor "Meeting in a Box" (MIB) - September 2007

Follow the orange link on the I&R Supervisor Portal for this month's MIB
CLICK HERE ← 308

August 29, 2007

Pre-packaged Communications for Meetings with Technicians

310

- Safety and Inspection
- KSM & Productivity
- Techs ROCK!
- Documentation & Training
- Products and Services
- Talking Points Successful communications require continuous improvement, so we are listening to your feedback! We understand it's sometimes difficult to get through all the material in 1 month, so we've provided no new material for 2 sections of this month's box. This is also designed to allow for time to complete the MIB Survey. Your feedback is valuable and very important in the success of all communication efforts.

Please review and deliver the following material with your respective teams within the next 30 days.

Safety and Inspection ← 314

- <u>Network Services Electrical Safety</u> - Review with your Technicians who work with outside plant.

KSM and Productivity ← 316

- <u>The Code of Conduct - I&R Techs</u> - Print and hand out to your Technicians
- <u>It's Just Common Sense - Tech Supervisor</u> - Review with your Technicians in a meeting

Techs ROCK ← 318

- <u>Technician Newsletter</u> - Print and Post only page 5 for the top 5 things to ensure Techs get credit for referrals. This is supplemental information the Technicians have received directly from Jeanie Nice via e-mail.

[x]

Team Charter

The Technician Communications Team, representing Technician Supervisors from all Districts and disciplines will identify issues, propose solutions, and implement a plan for action to improve the way National Staff FIGURE 3a and Regional District Teams communicate. Our focus will be on Technicians, with the intention to expand to all workgroups with a repeatable solution.

- Tech Business Cards - Review with your Technicians in a meeting.

Documentation and Training — 320

- No new material
- Next Generation Dispatch Coming Soon!

Products and Services — 322

- No new material

Talking Points — 324

- Technician Supervisor Talking Points - Review with your Technicians in a meeting.

Look for the monthly "Meeting in a Box" (MIB) on the last Wednesday of every month. October will be available on 9/26/07.

Please don't forget to complete the MIB Survey. Thank you!

326 → http://survey.

Your feedback and questions are requested and necessary for continuous improvement. Please contact us and let us know how we're doing!

FIGURE 3b

Meeting in a Box Archive

Return to MIB Window

Documentation & Training — 602

| | |
|---|---|
| DATA Check HSI Poster | 25-Jul-2007 |
| WFM Process Flow for IPCs | 25-Jul-2007 |
| The IPC Process | 25-Jul-2007 |
| Mgmt Guide to Customer Contact | 18-Jun-2007 |
| Calling All Customers | 18-Jun-2007 |

KSM & Productivity — 604

| | |
|---|---|
| Its Just Common Sense | 28-Aug-2007 |
| Tech Handout The Code of Conduct | 28-Aug-2007 |
| Keep Accurate Records-Tech Supv | 25-Jul-2007 |
| Keep Accurate Records-I&R Techs | 25-Jul-2007 |
| Working Efficiently & Effectively | 18-Jun-2007 |

Products & Services — 606

| | |
|---|---|
| Customer Advertising Portfolio | 25-Jul-2007 |
| MyEmbarq Portal FAQs | 18-Jun-2007 |
| Embarq Online Security | 18-Jun-2007 |
| National Marketing Offer Strategy | 18-Jun-2007 |
| MyEmbarq Account Benefits | 18-Jun-2007 |

600 — Close Window

Safety & Inspections — 608

| | |
|---|---|
| NS Electrical Safety for OSP | 28-Aug-2007 |
| Pole Safety | 25-Jul-2007 |
| Vehicle Inspection Checklist | 25-Jun-2007 |
| Vehicle Safety Inspection Overview | 18-Jun-2007 |

Talking Points — 610

| | |
|---|---|
| Tech Supervisor Talking Points Sept 07 | 28-Aug-2007 |
| Talking Points | 25-Jul-2007 |
| Tech Supervisor Talking Points July 07 | 25-Jun-2007 |

Techs ROCK! — 612

| | |
|---|---|
| Tech Business Cards | 29-Aug-2007 |
| ROCK Newsletter Sept 07 | 28-Aug-2007 |
| Chairman's Club 2007 | 25-Jul-2007 |
| ROCK Newsletter August 07 | 25-Jul-2007 |
| Roamin' with ROCK! | 18-Jun-2007 |

FIGURE 6

Human Metrics and Measurements
Survey Request

| | |
|---|---|
| Submitted by: | |
| Phone: | |
| E-mail: | |
| Business Unit/Divison: | Network Services |
| Date Submitted: | |
| Requestor: | |
| Requesting BU Director Approval | n/a |
| Surveyed BU Director Approval (if necessary) | n/a |
| Purpose of the Survey: | Meeting in a Box - Technician Spy |
| How will this survey be used? | To poll the Technician Supervisors on the use of the recently deployed "Meeting in a Box" |
| Who will use the survey? | |
| Desired Goal/Outcome of the survey (how will results be used)? | Continuously improve communication processes |
| Can an alternate to the survey be implemented? | no |
| If yes please provide reasoning for continuing with the survey in the "Additional Information" section. | |
| Highly Restricted Data: Does this survey include highly restricted data? For example: are Social Security Number, Birth Date w/Year, Salary, Age, Gender, Ethnicity, and Home Address Required? | no |
| Frequency (one-time or recurring)? | One-time |
| How many invitees? | 200 |
| Internal or external invitees? | Internal |
| Specific Business Unit or multiple (if so, which one's)? | n/a |
| Projected Response Rate? | 15% |
| Survey Open Date? | 8/23/2007 |
| Survey Close Date? | 9/7/2007 |
| Requested date for results? | 9/10/2007 |
| Are responses confidential? | No |
| What communication will go to invitees? | E-mail and Meeting in a Box reminder |
| Will demographic data be analyzed? | No |
| If so, what demographics are needed? | n/a |
| Will responses to each question be required or optional? | Both |
| How long will it take to respond to the survey? | 15 Minutes |

FIGURE 7a

| | 700 |
|---|---|
| # of questions? | 10 |
| Format of results? | Varies |
| Additional information | n/a |

710 → E-mail completed form to:

FIGURE 7b

Technician Supervisor's "Meeting-in-a-Box" Survey

800

What type of technicians do you supervise? (check all that apply)

- [ ] Installation & Repair
- [ ] Business         802
- [ ] Specials
- [ ] Central Office
- [ ] Cable So far, the majority of the "Meeting-in-a-Box" (MIB) material has focused on Installation and Repair (I & R). If you do not supervise I & R technicians, what would you like to see added for Business, Specials, Central Office or Cable? Leave blank if no response.

804

[text box]

Can you review the material in the MIB with your technicians in one month? If no, indicate how long it takes. (max char 255, text will wrap)       806

○ Yes
○ No [____]

FIGURE 8a

What material do you use for your meetings with the technicians that is NOT in the MIB? Leave blank if no response.

← 800

← 818

What topics of interest would you like to see in the future? Leave blank if no response.

← 820

Next

FIGURE 8C

SYSTEM AND METHOD FOR DISTRIBUTING ELECTRONIC INFORMATION

FIELD OF THE INVENTION

The field of the invention relates in general to the field of electronic information distribution, in particular, to a system and method for periodically distributing email notices to a selected level of individuals that contains links to relevant electronic information stored on secure online web servers.

BACKGROUND OF THE INVENTION

It is common for groups of individuals, whether in companies, associations, and the like, to inform others in their group about the latest developments relating to the group. For example, oftentimes, companies ask their supervisors to inform their employees about relevant and important activities, events, policies and the like at the company. Oftentimes, this information is not universally passed to the employees by all of the supervisors. In this example, many times certain supervisors only inform their respective supervised employees of this information that they themselves believe is important to them, and thus doesn't inform their supervised employees of all the information a particular company is trying to convey to all of their employees. In addition, some supervisors may not inform their employees of this information at all or significantly later making it less useful to their supervised employees. These types of inadequacies can occur in any type of entity, association, group, business, affiliation and the like where information is to be passed or forwarded from a central point to others within the entity.

Some of this information can be in the form of standards, policies, methods, procedures, job aids, job descriptions, and job duties. An entity may want all of this information uniformly passed down to all their employees. Yet, as described above, this information may not be passed or forwarded down uniformly or at all to the individuals associated with the entity. Some reasons for this inconsistent information delivery is caused by the geographic disbursement of the individuals across large area of the world. Some entities may have different offices spread across the world or a particular country. Other reasons may be that those individuals responsible for dispersing this information do not come into routine contact with those who are to receive it due to travel or other activities that keep these individuals apart. Other times the distance between offices causes the information to be delivered later than useful.

Likewise, in other times, there are no processes in place to ensure or verify that individuals responsible for forwarding this information in a uniform way do so. A particular entity may request that certain individuals forward this information, but they do not do so as instructed and the entity may not be aware of this deficiency.

Further, an organization may typically "push" such information from the top down rather than from the bottom up. This means that a central location of the organization makes the sole decision regarding the content of the information to be disbursed to others within the organization. This oftentimes does not match the interest or format of those that are to receive this information, thus making the disbursement less effective than it could otherwise be.

SUMMARY

In one embodiment, the present system and method for distributing electronic information ("system for distributing electronic information") provides for acquiring information from certain individuals or groups of individuals that may be expert or knowledgeable in a particular area of interest that is to be included in a particular information disbursement. In addition, input may be received from individuals who are to receive the information regarding their preferred content of the information and the like. The information is then transmitted to selected individuals via an electronic means, such as via email. The email may contain organized summaries of the information, including headings and categories of the information, and further may include a link or links to a file server or portal where the information may be stored for viewing and downloading.

In one embodiment, a hit counter may be employed that recognizes the IP address of all computing devices contacting the file server to keep record of those individuals who and when individuals have accessed a particular file server and those who haven't. This way an organization may keep track of those individuals who have and haven't accessed this information for disbursement. This way an organization may take further actions to ensure that the information is accessed by those individuals that haven't done so in a timely manner.

In one embodiment, the present system for distributing electronic information includes an electronic distribution means such as an email that is distributed to selected individuals within an organization. The email contains organized categories of summarized information for viewing and a link to a server where the information is stored in documents for downloading. Additionally, the present system for distributing electronic information may include a means for determining those computers accessing the system to enable access and noting those who have accessed the information and those that haven't.

In another embodiment, the present system for distributing electronic information includes a "Meeting in a Box" that is intended to be communicated with all individuals and/or groups of individuals of an organization, such as Technician Supervisors. The present system for distributing electronic information provides consistent and standard information of priority to these Technician Supervisors, therefore minimizing the time and administrative work required for meeting preparation. In this embodiment, another level of an organization or association, such as a Technician Communications Team, representing Technician Supervisors from all Districts and disciplines will identify issues, propose solutions, and implement a plan for action to improve the way national staff and Regional District Teams communicate. In one aspect, the term District and the like means a geographic location. In this embodiment, the present system for distributing electronic information focuses on Technicians, with the ability to expand to all workgroups with a repeatable solution. In one aspect, the present system for distributing electronic information may include: Safety and Inspection—Mandated training and inspection material provided by a Environmental Health and Safety of an organization; KSM & Productivity—Key Service Metrics and Productivity District level information, including expected Technician behaviors (complete technician series); Techs Referring to Our Customers as Key "(ROCK)"—Technician sales referrals information, including contests, revenue, and volume; Documentation & Training—A review of operational documentation that outlines processes and standard methods and procedures. This is the "cliff notes" version of published documentation so it's easy to read and understand for immediate use. In another aspect, the operational documentation may further include audio and video materials as well. Training material is also delivered in non-standard formats so it's interesting and engaging; Products and Services—A review of the organizations products and services available to customers. This is meant to improve employee knowledge; and Talking Points—High level review of an organization's level communication including community involvement, executive communication, and human resource information. Other communication tools offer solutions for knowledge management, but not pre-packaged material for meetings.

In one embodiment, the present system for distributing electronic information includes a central email client connected to an email sending server, the central email client connected to an addressee's computer operating an addressee's email client connected to a email receiving server, the email sending server and the email receiving server utilizing a common email system protocol to send an email over the network; and a first selectable link displayed on the email, the first selectable link associated with an Internet portal containing one of a second selectable link and a first set of information categories, the second selectable link and the first set of information categories stored on an Internet server connected to the network, the second selectable link and the first set of information categories displayed to the addressee's computer when the first selectable link is selected.

BRIEF DESCRIPTION OF THE DRAWINGS

FIGS. 3a-3b illustrate an exemplary screenshot of an email from a graphical user interface ("GUI") for distributing electronic information according to an embodiment of the present invention;

FIG. 6 illustrates an exemplary screenshot of a GUI for distributing electronic information depicting particular features according to an embodiment of the present invention;

FIGS. 7a-7b illustrate an exemplary screenshot of a GUI for distributing electronic information depicting particular survey results according to an embodiment of the present invention;

FIGS. 8a-8d illustrate an exemplary screenshot of a GUI for distributing electronic information depicting particular survey intake forms according to an embodiment of the present invention.

DETAILED DESCRIPTION OF THE DRAWINGS

Figure 1:
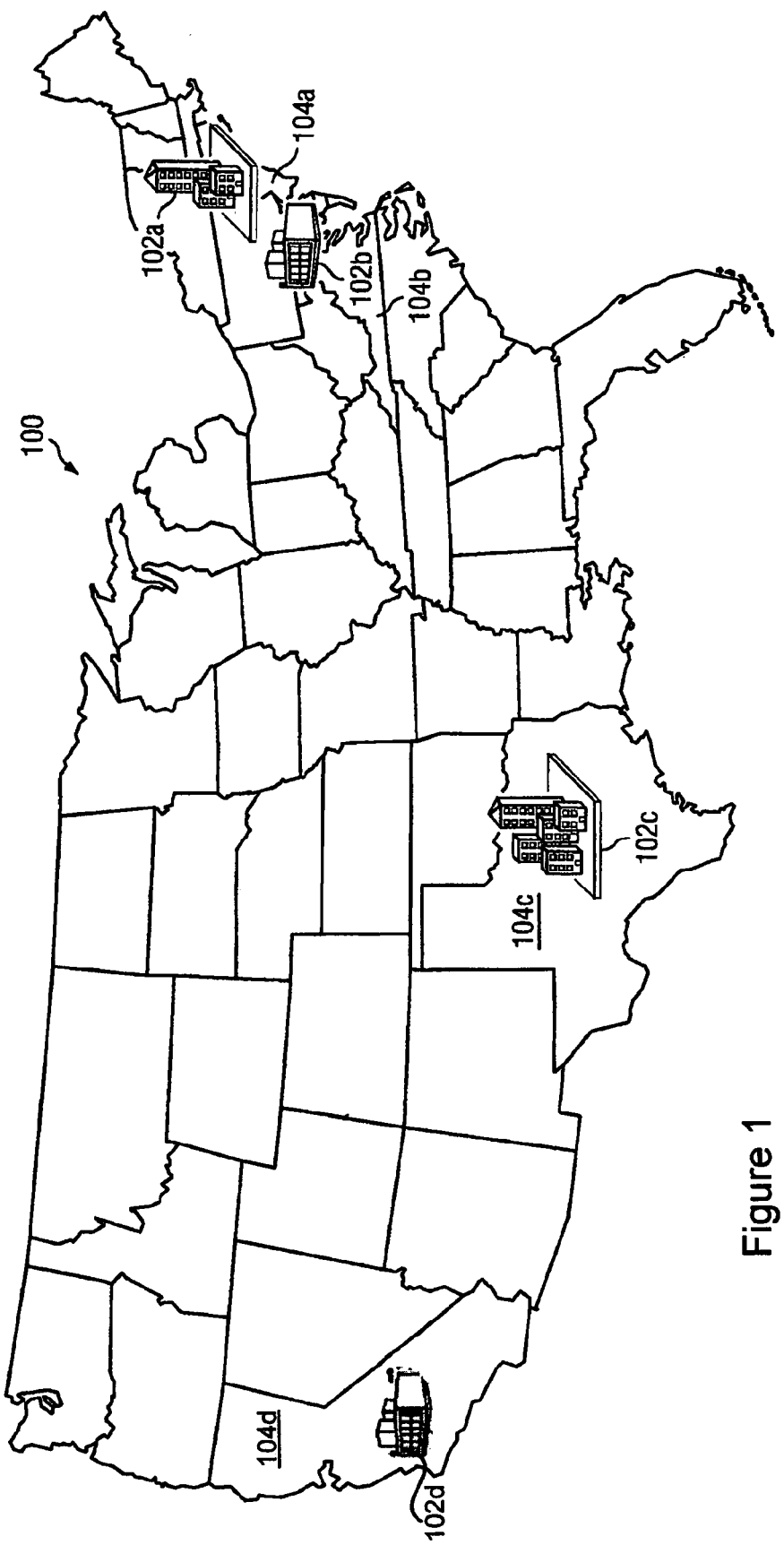
FIG. 1 illustrates a map of an exemplary number of offices and a central location according to an embodiment of the present invention.

In the drawings, like or similar elements are designated with identical reference numerals throughout the several views and figures thereof, and various depicted elements may not be drawn necessarily to scale.

FIG. 1 is a map 100 that includes an exemplary assortment of locations 102b-102d, each in a different state 104b-104d. An exemplary number of states or locations are shown in FIG. 1, nevertheless, the present system for distributing electronic information may include locations anywhere. A central location 102a may be located in Washington, D.C., for example, as shown. The central location 102a may include individuals, groups, employees, data-entry employees, clerical employees, data-management employees, collectors, engineers, accountants, technicians, and the like that operate the central location 102a. The central location 102a may further include individuals, group of individuals, executives, management committee, human resources administration, marketing administration, and other administration functions. In another embodiment, the locations 102b-102d and central location 102a may be located in any other state or country.

Figure 2:
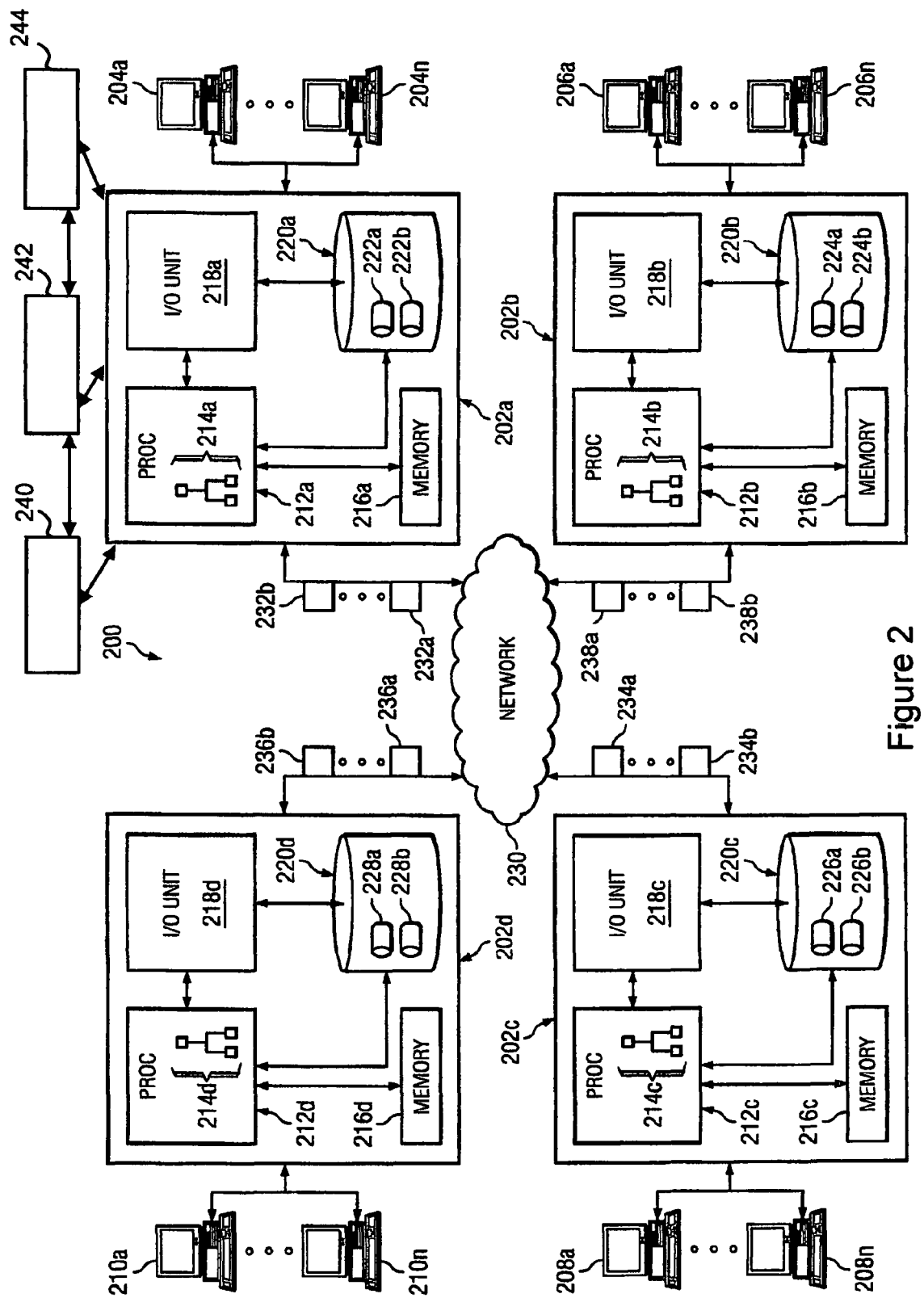
FIG. 2 illustrates a block diagram of an exemplary network of computers in a system for distributing electronic information according to an embodiment of the present invention.

FIG. 2 is a block diagram of an exemplary network of computers 200 utilized by the present system for distributing electronic information, such as that shown in FIG. 1. Central location 102a may utilize server 202a and the locations 102b-102d may utilize server 202b, 202c, and 202d, respectively, (202a-202d collectively 202). The servers 202 may host personal computers 204a-204n, 206a-206n, 208a-208n, and 210a-210n, respectively, utilized by the employees or individuals of the central location 102a and the locations 102b-102d.

The server 202a may include a processor 212a that executes software 214a. The processor 212a may be in communication with memory 216a, an input/output (I/O) unit 218a, and a storage unit 220a. The storage unit 220a may store databases or data repositories 222a-222b thereon. The software 214a may include instructions for execution by the processor 212a for providing network connectivity and computer status information in accordance with the principles of the present system for distributing electronic information. In one embodiment, the software 214a is composed of a software program relating to email applications and website applications as further described herein. The server 202a may be physically located or utilized by the central location 102a.

Another location may utilize the server 202b. The server 202b may include a processor 212b that executes software 214b. The processor 212b may be in communication with memory 216b, I/O unit 218b, and storage unit 220b. The storage unit may store databases 224a-224b for storing information associated with the computers and networks in the present system for distributing electronic information. Each of the other locations may utilize the servers 202c and 202d, which may include the same or similar internal components as those of servers 202a and 202b, which are shown, accordingly. Each of the servers 202 may communicate via a network 230. The network 230 may be the Internet, intranet, WANs, LANs, or other communication systems capable of communicating information between computing devices. The server 202a may communicate data packets 232a-232b containing information related to any of the computer and networks of the company to another server 202b through data packets 238a-238b, as understood in the art. Similarly, the servers 202c and 202d may communicate information to the server 202a via data packets 234a-234b and 236a-236b, respectively, via the network 230. In addition, network 230 may be a communications network, a computer network, an internet network or a combination of them, and the like.

In operation, the server 202a may execute the software 214a to enable the locations of the present system for distributing electronic information to utilize their personal computers 206a-210n, for example, either directly with the server 202a or indirectly via the network 230. The personal computers 206a-210n enable the individuals of the locations of the present system for distributing electronic information to interface with the software 214a to display emails, information, links, and the like. Personal computers 204a-204n, 206a-206n, 208a-208n, and 210a-210n may also include other peripherals, such as keyboards, displays, microphones, and the like.

One feature of software 214a-214d is that it enables individuals to post, view, and download information of interest to certain subgroups, groups, and individuals associated with the locations. The information related to the present system for distributing electronic information may include name, addresses, telephone numbers, FAX numbers, e-mail addresses, hyperlinks, links, stored documents, stored graphical images, stored data, and the like.

In one aspect, the server 202a may be in communication with subject matter experts 240, graphical experts 242, and additional sources 244 for providing support and information that may be contained in the categorized electronic information presented to all or a portion of the individuals.

In one embodiment, a standard email application follows a standard industry protocol for handling email on the Internet, referred to as SMTP. SMTP is a Transmission Control Protocol/Internet Protocol ("TCP/IP") protocol for sending email between servers. Virtually all email systems that send email over the Internet use SMTP. Typically, an email is sent via SMTP to a POP3 (Post Office Protocol) server ("email server") where an individual or addressee retrieves the email. Because of SMTP and POP3, an individual specifies both the POP3 server and SMTP server when they set up their email account using their email client application, such as Microsoft® Outlook®, Eudora®, Pegasus, etc. In one embodiment, an email client is generally a software 214a-214d that is run on personal computers 204a-204n, 206a-206n, 208a-208n, and 210a-210n that displays text and menus on the monitor of the personal computers 204a-204n, 206a-206n, 208a-208n, and 210a-210n. The email client application generally resides on the local drive or memory of the personal computers 204a-204n, 206a-206n, 208a-208n, and 210a-210n. The storage units may store databases or data repositories thereon. The software 214a-214d may include instructions for execution by the processor 212a-212d for providing network connectivity information and the like. In one embodiment, the software is composed of a instructions for displaying GUI options menus and submenus to a user as further described herein.

Among other email functions, the email clients generally display to an individual or addressee all of the messages that are in their inbox, by displaying message headers that include the sender of the email, subject of the email, and the time and date that the email was sent. The email clients also allow the individual or addressee to create new messages and send them to other users or addressees. Thus, for purposes of the present system for distributing electronic information, the email client will be considered part of the personal computers 204a-204n, 206a-206n, 208a-208n, and 210a-210n. In one embodiment, the email sender may be individuals and/or personal computers 204a-240n and email receiver may be individuals and/or personal computers 206a-206n, 208a-208n, and 210a-210n. In one embodiment, a sender may be located at location 102a and receivers may be located at 102b-102d.

In one embodiment, servers 202 may be used to handle the email service functions. In another embodiment, other servers, such as SMTP, POP3, Internet Mail Access Protocol ("IMAP") servers are used for handling the incoming email messages. Typically, SMTP servers are for handling the outgoing email messages. Servers 202 may include these email server functions or they may be in communication with these types of servers for communicating email messages as described herein.

When an individual subscribes or is connected to an Internet service provider ("ISP"), they usually also gain access to that ISP's SMTP server. In one embodiment, these ISPs are provided by telecommunications companies, ISPs, organizations, companies, and the like. Individuals access the network 230 through their ISP using a dialup or high-speed line connection and a standard browser, such as Internet Explorer® or Netscape®. ISPs may typically have one or more SMTP servers. SMTP servers generally interact with email clients, respectively, to send email from an email sender to an email receiver. The ISP operates at a website address corresponding to its domain name which is addressable by individuals on the network 230. The ISP's service functions are performed for a large number of subscribers through one or more servers. The ISP or host SMTP server may interact with other SMTP servers over the network 230 when sending emails. When a user sets up or is connected to an email account with an ISP, company, and the like, they set their email client to the name of an ISP mail server, such as "johndoe@johndoe.com." When an email sender sends an email to an email receiver, the email sender's email client, which resides on the personal computers such as, personal computers 206a-206n, 208a-208n, and 210a-210n, typically communicates with their ISP's SMTP server telling the SMTP server the email address of the email sender, the address of the email receiver, and the body of the email in addition to other information. The email sender's SMTP server breaks down the email receiver's address into the email receiver's user name and the domain name. If the email receiver's user name is a member of the same ISP or domain name, email server, as the email sender's, the SMTP server will send the email to the POP3 server located at the ISP for delivery to the email receiver. If the email receiver is not a member of the email sender's SMTP server, then the email sender's SMTP server will need to communicate with another SMTP server, email server, via the network 230, at the email receiver's ISP or domain name, for example.

In one embodiment, this communication involves the email sender's SMTP server inquiring at the Domain Name Server ("DNS") for the Internet Protocol address ("IP address") for the SMTP server for the domain, for example "yyy.com" of the email receiver. The DNS returns to the email sender's SMTP server with the IP address of one or more SMTP servers for the domain name "yyy.com" of the email receiver. The email sender's SMTP server then connects with the SMTP server for the email receiver and inquires whether the IP address of the email receiver is at the SMTP server for the email receiver. If the email receiver's IP address is at the email receiver's SMTP server, then the email sender's SMTP server transmits the email to the email sender's domain name or email server, which is then transmitted to the email receiver's POP3 server, which puts the message in the inbox of the email receiver's email client.

To receive the email, the email receiver logs into their POP3 server from their email client that resides on their computer, such as personal computers 206a-206n, 208a-208n, and 210a-210n, and issues a series of commands to the email receiver's POP3 server. The POP3 server then opens the email text file and transmits the email to the email receiver's local computer, such as personal computers 206a-206n, 208a-208n, and 210a-210n. Generally, the POP3 server acts as an interface between the email receiver's email server and their email client. After transmitting the email to the email receiver's email client, the email is deleted from the email receiver's POP3 server. The above relating to POP3 servers can also be employed on an IMAP server as well. An IMAP server holds or stores the email instead of deleting it so that it can be accessed later. Email servers also typically employ queues for holding email that is not able to be transmitted instantly due to a problem or connection with other SMTPs over the Internet.

An email application of the present system for distributing electronic information further may include a receiver coder/decoder, preferably in the form of instructions or software that resides on both the email sender's email server and the email receiver's email server. The coder/decoder may also operate on the email sender's computer and the email receiver's computer in conjunction with the email sender's email client and the email receiver's email client. Further, the coder/decoder may include hardware, computer readable memory, or both, for storing the prioritized emails.

FIGS. 3a-3b illustrate an embodiment 300 of an exemplary screenshot of a GUI of the present system for distributing electronic information depicting an email sent by the central location 102a and received by one or all of the locations 102b-102d. The email 300 is sent to particular individuals or groups of individuals located in different states 104b-104d. The email 300 may include a subject line 302 noting the subject of the email 300. In one aspect, the subject line 302 may note a particular period of time for the information contained in the email 300. In addition, the email 300 may include additional information 304, such as "From," "To," "Cc," and "Importance." The information 304 typically notes the sender and receiver of the email 300 and its importance.

The email 300 may further include a body 306 that includes a button or link 308, information categories 310, and information summaries 312. The information categories 310 may contain a concise listing of the important categories that are contained in a particular email 300. The categories contained in the information categories 310 may be created to reflect the important categories for a particular individual, group of individuals, sets of individuals, and the like. In one aspect, these categories convey relevant information for a particular set of supervisors and/or managers in a company that is required to be passed to the employees that they supervise and/or manage. The information summaries 312 may contain the headings listed in the information 310 and related summaries, such as Prepackaged Communications for Meetings with Technicians 314, Safety and Inspection 314, KSM and Productivity 316, Techs ROCK 318, Documentation and Training 320, Products and Services 322, and Talking Points 324. These summaries and heading may be contained in the information, summaries 312. In one aspect, some of the information contained in each summary may be highlighted, underlined, or noted to bring attention to the receiver that these are documents stored in the present system for distributing electronic information.

In another embodiment, the present system for distributing electronic information includes a "Meeting in a Box" that is intended to be communicated with all individuals and/or groups of individuals of an organization, such as Technician Supervisors. The present system for distributing electronic information provides consistent and standard information of priority to these Technician Supervisors, therefore minimizing the time and administrative work required for meeting preparation. This is important because Technician Supervisors must focus on productivity, quality, and team development along with their roles as supervisors and the present system for distributing electronic information enables them to do so. In this embodiment, another level of an organization or association, such as a Technician Communications Team, representing Technician Supervisors from all Districts and disciplines will identify issues, propose solutions, and implement a plan for action to improve the way national staff and Regional District Teams communicate. In this embodiment, the present system for distributing electronic information focuses on Technicians, with the ability to expand to all workgroups with a repeatable solution. In one aspect, the present system for distributing electronic information may include: Safety and Inspection—Mandated training and inspection material provided by a Environmental Health and Safety of an organization; KSM & Productivity—Key Service Metrics and Productivity District level information, including expected Technician behaviors; Techs ROCK—Technician sales referrals information, including contests, revenue, and volume; Documentation & Training—A review of operational documentation that outlines processes and standard methods and procedures. This is the "cliff notes" version of published documentation so it's easy to read and understand for immediate use. Training material is also delivered in non-standard formats so it's interesting and engaging; Products and Services—A review of the organizations products and services available to customers. This is meant to improve employee knowledge; and Talking Points—High level review of an organization's level communication including community involvement, executive communication, and human resource information.

The link 308 may be navigation element, such as a hyperlink, embedded link, hot area, inline link and the like that when selected by a receiver. The link 308 is contained in the email 300 to enable a receiver to easily access additional information and the stored documents associated with the information categories 310 and information summaries 312. In one embodiment, once a receiver "clicks" or "selects" the link 308, their personal computer 206a-206n, 208a-208n, and 210a-210n may be directed to another web page or site located at personal computer 204a-204n or server 202, such as that shown in FIG. 4.

Figure 4:
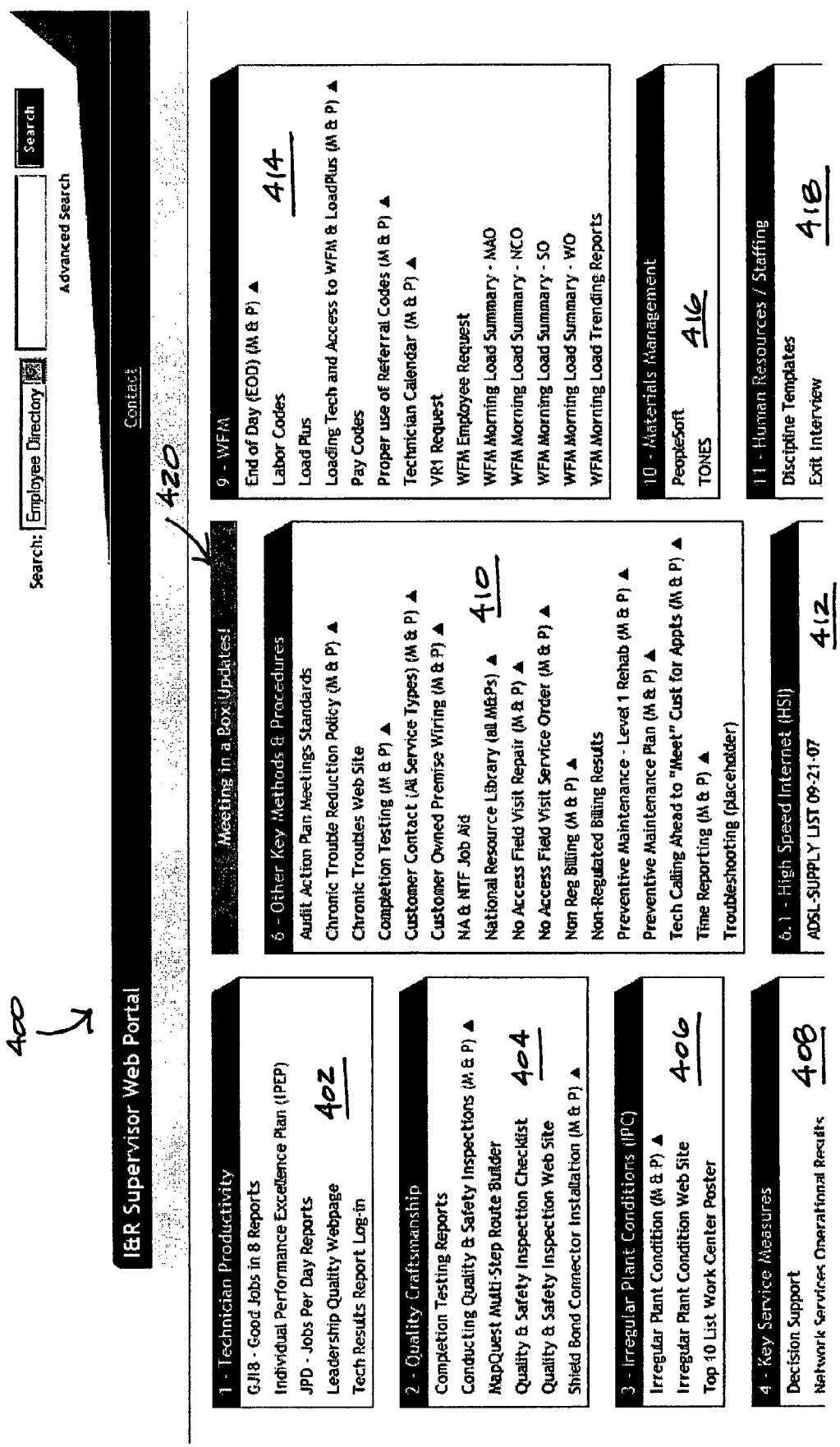
FIG. 4 illustrates an exemplary screenshot of a GUI for distributing electronic information depicting particular features according to an embodiment of the present invention.

FIG. 4 illustrates an embodiment 400 of an exemplary screenshot of a GUI of a web portal of the present system for distributing electronic information depicting an a stored document or page stored on server 202 that is displayed to the receiver or individual on their personal computer 206a-206n, 208a-208n, and 210a-210n. The web portal 400 may display to a receiver on their personal computer 206a-206n, 208a-208n, and 210a-210n an assortment of miscellaneous categories and information that are complimentary to the more particular categorized information contained in the information categories 310 and information summaries 312 that is displayed in FIG. 5. For example, the web portal may display the complimentary information such as Technician Productivity 402, Quality Craftsmanship 404, Irregular Plant Condition (IPC) 406, Key Service Measures 408, Other Key Methods and Procedures 410, High Speed Internet (HSI) 412, WFM 414, Material Management 416, and Human Resources/Staffing 418. Each of these complimentary information sections may include additional information as shown in FIG. 4.

In addition, web portal 400 may include a titled link 420, such as "Meeting in a Box Updates," as shown in FIG. 4. This link 420 may be a link having similar routing or directing functionality, such as that described regarding link 308 above. In one embodiment, once a receiver "clicks" or "selects" the link 420, their personal computer 206a-206n, 208a-208n, and 210a-210n may be directed to another web page or site located at personal computer 204a-204n or server 202, such as that shown in FIG. 5.

Figure 5:
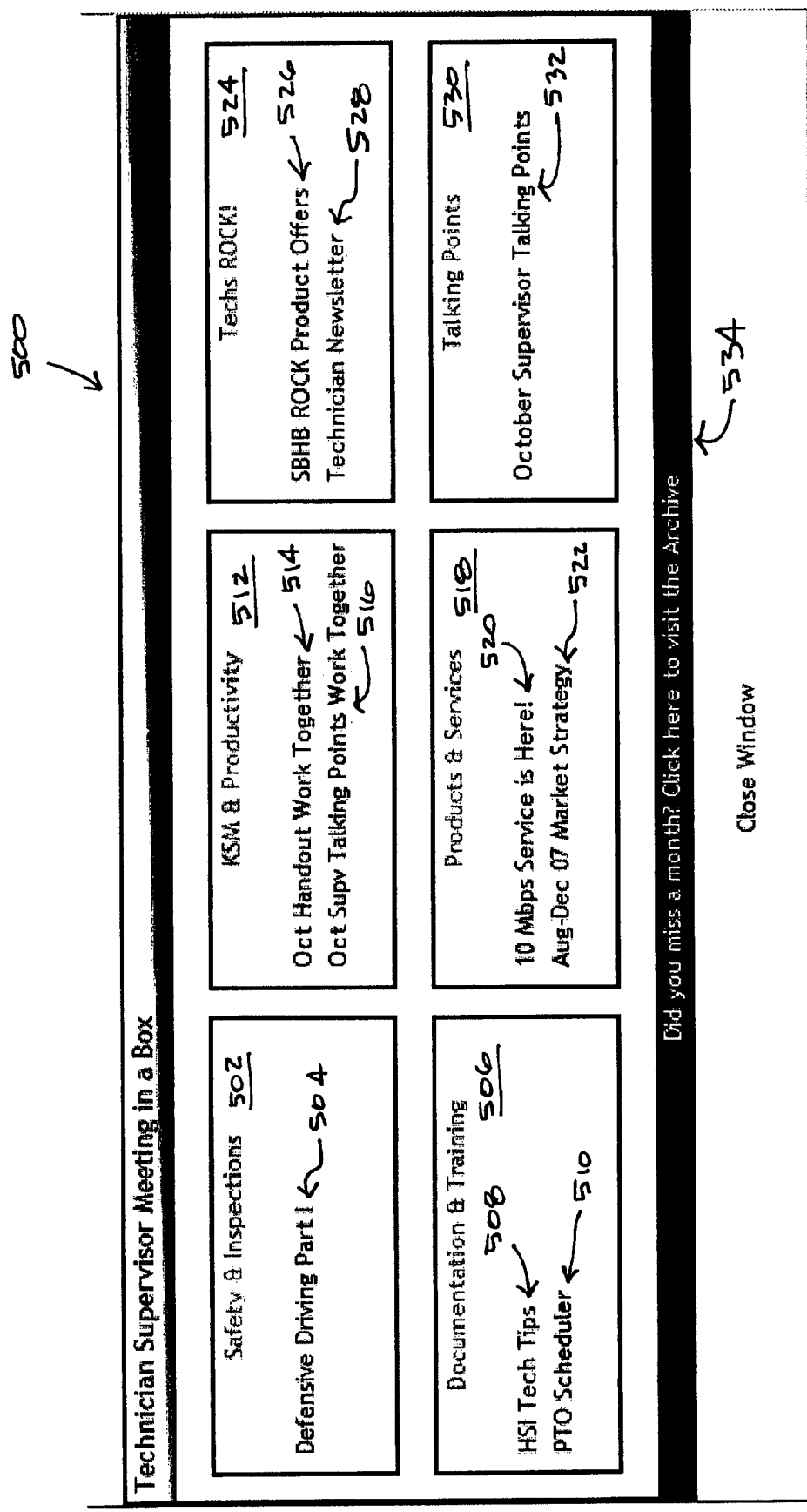
FIG. 5 illustrates an exemplary screenshot of a GUI for distributing electronic information depicting particular features according to another embodiment of the present invention.
Figure 8B:
Figure 8D:
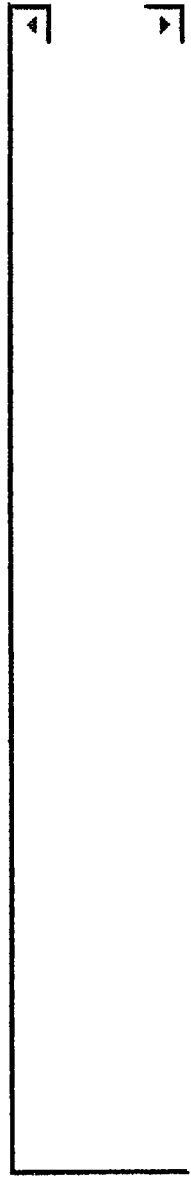
Figure 9:
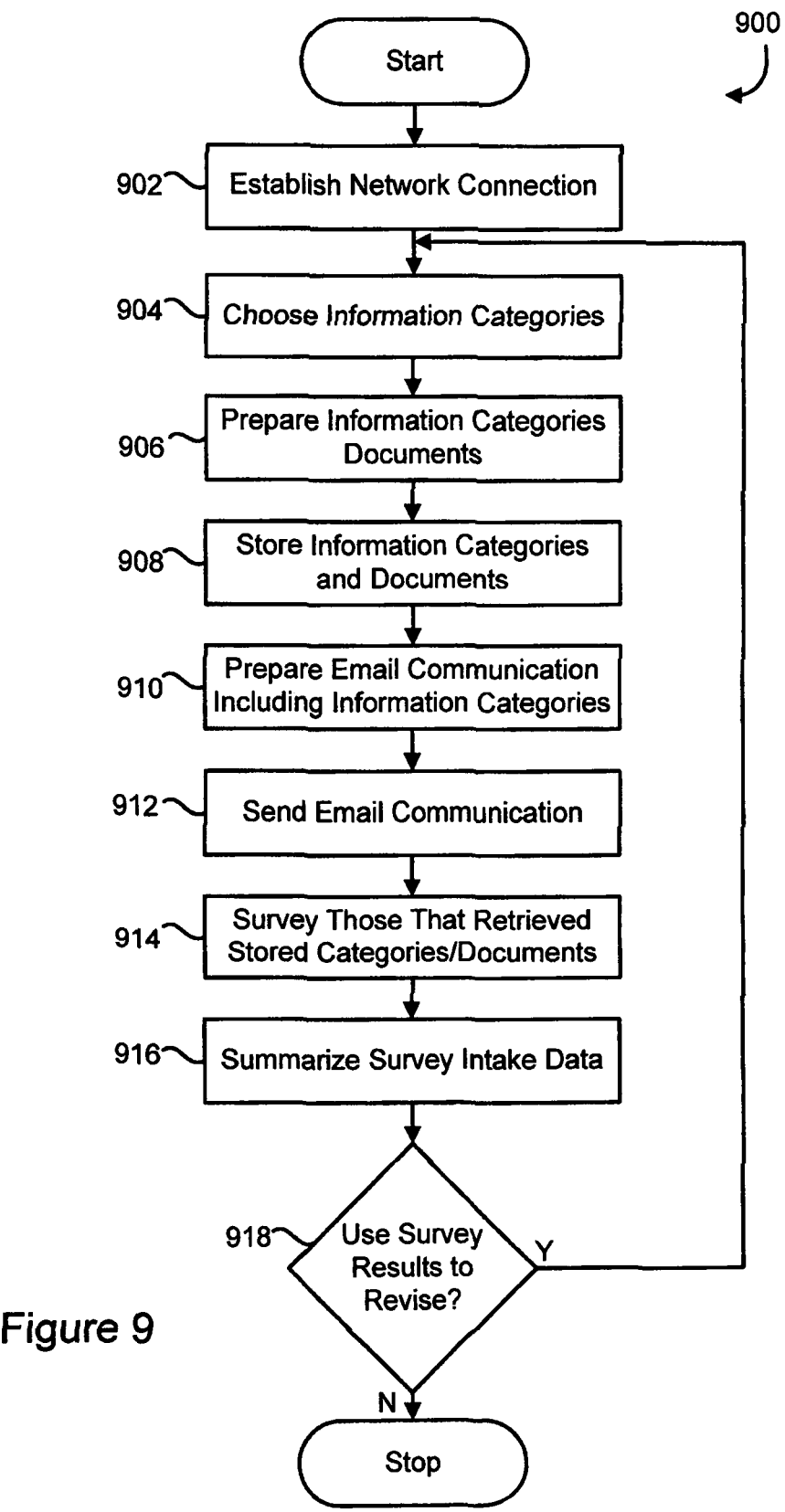
FIG. 9 illustrates a flow chart of an exemplary process for distributing electronic information according to an embodiment of the present invention.

FIG. 5 illustrates an embodiment 500 of an exemplary screenshot of a GUI of a web page titled, "Meeting in a Box" of the present system for distributing electronic information depicting the stored categories and their related documents that may be stored on server 202 that is displayed to the receiver or individual on their personal computer 206a-206n, 208a-208n, and 210a-210n. In this embodiment, the Meeting in a Box 500 web page includes the information categories Safety and Inspection 502, Documentation and Training 506, KSM and Productivity 512, Products and Services 518, Techs ROCK! 524, and Talking Points 530. These information categories correspond to those found in FIGS. 3a-3b. The information category Safety and Inspection 502 depicts a link 504 to a document titled, "Defensive Driving Part I;" the information category Documentation and Training 506 depicts a link 508 to a document titled, "HSI Tech Tips," and a link 510 to a document titled, "PTO Scheduler;" the information category KSM and Productivity 512 depicts a link 514 to a document titled, "Oct Handout Work Together," and a link 516 to a document titled, "Oct Supv Talking Points Work Together," the information category Products and Services 518 depicts a link 520 to a document titled, "10 Mbs Service is Here!," and a link 522 to a document titled, "August-December 7 Market Strategy," the information category Techs ROCK! 524 depicts a link 526 to a document titled, "SBHB ROCK Product Offers," and a link 528 to a document titled, "Technician Newsletter," and the information category Talking Points 530 depicts a link 532 to a document titled, "October Supervisor Talking Points." In addition, if an individual accessing the Meting in a Box 500, they may also be presented with a link 534 for accessing archived stored documents. In one embodiment, these documents may be updated on a periodical basis that is convenient for an organization and makes sense in light of the amount of new material to be presented, for example once a month.

In one embodiment, these documents are stored on the server 202 or elsewhere in the present system for distributing electronic information for easy access by the individuals at locations 104a-104d. When an individual clicks on any of these links, their personal computer 204a-204n, 206a-206n, 208a-208n, and 210a-210n are directed to the associated actual document for viewing, downloading, and printing at their personal computer 204a-204n, 206a-206n, 208a-208n, and 210a-210n. For example, if a company wishes to direct that all supervisors within their organization be informed on a periodical basis on these information categories, then they would prepare the documents and store them to a server and then prepare and send an email 300 as described above. In another embodiment, any other types of categories may be used to instruct, inform, educate, and the like certain individual and/or groups of individuals on particular categories and/or topics that are desired. The information categories described herein are exemplary categories and topics and are meant to be limiting in anyway or manner.

The central location 104a may solicit individuals and/or groups of individuals regarding which topics and/or categories would be most beneficial to a particular association and to be included in email 300. This solicitation may take place through surveys, calls, emails, written correspondence, and the like to determine the most effective and relevant subject matter for emails 300 for a particular organization, association, individual, groups of individuals, and the like. Once the central location 104a determines those topics and categories of information that are to be contained in the email 300 and its related links, then experts and/or those possessing knowledge of these topics may prepare the actual documents that are stored at the server 202. Then, these documents are stored on the servers 202.

In one embodiment, the present system for distributing electronic information further includes a tracking mechanism that accounts for those individuals listed in the "To" field of the email 300 that have and have not accessed the stored documents on the server 202 for determining the compliance of reviewing and downloading the stored documents. In one aspect, the present system for distributing electronic information keeps track of the IP addresses of those accessing the stored documents on the server 202 and correlating them to particular individuals within an organization. Then, a comparison of the "To" addressees may be made to the tracked IP addresses to determine those individuals that have and have not accessed the stored documents. In one embodiment, the present system for distributing electronic information may include time limits for accessing and viewing the individual documents contained in the information categories Safety and Inspection 502, Documentation and Training 506, KSM and Productivity 512, Products and Services 518, Techs ROCK! 524, and Talking Points 530. In one aspect, the present system for distributing electronic information may track the addressees that don't access and review these documents within a predetermined time period, such as 30 minutes. Where a larger volume of documents are posted, the present system for distributing electronic information may provide for additional time to access and review the documents, such as 30 days for 10 documents or more, for example.

FIG. 6 illustrates an embodiment 600 of an exemplary screenshot of a GUI of a web page titled, "Meeting in a Box Archive" of the present system for distributing electronic information depicting the archived categories and their related documents that may be stored on server 202 that is displayed to the receiver or individual on their personal computer 206a-206n, 208a-208n, and 210a-210n. In one embodiment, the Meeting in a Box Archive 600 may include archives of the stored document in categories that may be similar as those found in Meting in a Box 500 including: archived Documentation and Training 602, archived KSM and Productivity 604, archived Products and Services 606, archived Safety and Inspections 608, archived Talking Points 610, and archived Techs ROCK! 612. These archived categories may include links to the actual archived documents listed under each archived category, such as DATA Check HST Poster, WFM Process Flow for IPCs, etc. associated with the archived Documentation and Training 602. Any past dates of archived documents may be stored and linked on the server 202. The Meting in a Box Archive 600 will continue to grow in size as each past month's documents and materials are archived to clear the categories for new material and documents.

FIGS. 7a-7b illustrate an embodiment 700 of an exemplary screenshot of a GUI of a survey results form of the present system for distributing electronic information requesting information relevant to the email 300, stored documents, information categories, and the like that is displayed to the receiver or individual on their personal computer 204a-204n, 206a-206n, 208a-208n, and 210a-210n. In one embodiment, the survey results 700 includes a general individual information section 702 that includes particular information relating to a particular individual and/or groups of individuals completing the survey results 700, such as phone, email address, business unit, date submitted, requestor, and related approval information.

In addition, the survey results 700 may include a purpose section 704 that may include inquiries such as how will the survey be used, who will use the survey, and the desired goal of the survey results 700. The survey results 700 may further include inquiries relating to whether the another alternate may be used in place of the survey. Additionally, the survey results 700 may include statistical data relating to the survey results 700 such as, frequency, how many invitees, internal or external invitees, specific business unit, projected response rate, survey open date, survey close date, requested date for results, whether assistance is needed for the analysis or just data, are responses confidential, what communication will go to invitees, will demographic data be analyzed, demographics needed, will responses to all questions be required or optional, how long it will take to respond to the survey request, number of questions, and format of results. In addition, a reply email address 710 may be included on the survey results 700. In one embodiment, the survey results 700 may be reviewed by users of the present system for distributing electronic information for improving its content and size.

FIGS. 8a-8d illustrate an embodiment 800 of an exemplary screenshot of a GUI of a survey intake form of the present system for distributing electronic information depicting a query 802 relating to the type of technicians that the survey participant supervises. A survey participant is typically an individual that is responsible for forwarding or informing other under his supervision, for example. In one aspect, the intake survey 800 is directed to Technician Supervisor's of a company. In another aspect, the intake survey 800 may be utilized with other levels of individuals and/or groups of individuals with any type of organization or business. In this embodiment, the query 802 includes answers relating to different types of technicians, such as installation and repair, business, specials, central office, and cable. The intake survey 800 may further include a query 804 for additional areas of interest that the survey participant would like to see as part of the Meeting in a Box 500, in addition to those currently described as in FIG. 5.

Intake survey 800 may further include a query 806 requesting whether a participant is able to review the Meeting in a Box 500 information categories, documents, materials, and the like in a given amount of time, such as one month, for example. This information may be used by the present system for distributing electronic information to evaluate whether there is insufficient time to review all of the material, which may lead to a conclusion that there is too much information to review. Or it may show that most of the participants can complete the review in a predetermined amount of time, but that a few may not, thus indicating that the amount of information is not excessive. In addition, the intake survey 800 may include a query 808 about whether the archive information categories and related documents as shown in FIG. 6.

Another portion of the intake survey 800 may include an input table 810 having quality ratings 812 and importance ratings 814 for each of the information categories herein described. This enables a participant to quickly rate these categories and their contents. Further, the intake survey 800 may include a query 816 requesting the frequency that a participant expects to use the MIB 500. The intake survey 800 may also include a query 181 requesting what materials that a particular participant uses in their meetings with their technicians, for example, that is not part of the MIB 500. Categories of information that may useful in the future for a particular participant may be entered in query 820. The intake survey 800 may also query 822 how easy the MIB 500 is to use for a particular participant. Finally, at query 824, a participant may enter any additional comments or suggestions regarding the MIB 500. The intake survey 800 may then be submitted to the present system for distributing electronic information by selecting the submit survey button 826.

In addition to the aforementioned aspects and embodiments of the present system for distributing electronic information, the present invention further includes methods for informing individuals and/or groups of individuals of relevant information that is stored on servers. FIG. 8 illustrates an embodiment 900 of a method for informing individuals and/or groups of individuals. In step 902, a connection is established between a central computer operating a central email client that is connected to an email sending server and a plurality of addressees' computers that are each operating an addressee email client. Preferably, the addressee email client is connected to an email receiving server and the email sending server and the email receiving server utilize a common email system protocol to send an email over the network. In step 904, the information categories are chosen by individuals or groups of individuals of a particular organization, association, and the like. This step may include reviewing surveys and the like to determine the most effective information to be contained in the information categories.

In step 906, documents relating to the information categories are prepared by those within or outside a particular organization that relate to the specific information categories. In step 908, the documents are stored at a server that is accessible and linked to a button or link displayed on the email to an individual and/or group of individuals. Additionally, this step may include storing other summaries and links that are accessible by the information and links contained in the email. In step 910, one or more emails are prepared that include links and summaries of the information categories relevant to each email and the desired information to be conveyed relating to that particular email. In step 912, the email is sent to one or more email addressees that are part of an organization, association, group, business, company, affiliation, and the like. Finally, in step 914, a survey may be sent to one or more addressees within an organization. This step may include completing the survey and sending it back to the central office or computer for determining the effectiveness of the email, information categories, and related stored documents containing specific information as described herein. In step 916, the survey intake data is summarized into the survey results that may be used to revise, edit, modify, add, and/or delete certain information categories and their contents of the MIB 500. A query at step 918 is performed to determine if it is to be used in such a manner. If so, then the process may return to step 904 where the survey data or results are used by the individuals and/or groups of individuals to revise the MIB 500.

There has been described a system and method for distributing electronic information. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, particular additional servers, computers, networks and the like may be used to convey the information categories and related stored documents without departing from the inventive concepts.

What is claimed:

1. A computer implemented method for distributing information within an organization, the method comprising:
   generating a user interface that contains a set of information categories, the set of information categories having hyperlinks to stored documents containing information that is distributed to employees of the organization;

determining a subset of information categories from the set of information categories for a supervisor based on a practice group associated with the supervisor;

generating an electronic mail message that identifies the subset of information categories and information within the subset of information categories that is to be distributed by the supervisor to the employees supervised by the supervisor, and wherein the electronic mail message includes a hyperlink to the user interface; and transmitting the electronic mail message to the supervisor to notify the supervisor of the information within the subset of information categories that is to be distributed to the employees supervised by the supervisor.

2. The method of claim 1, wherein the user interface is only accessible to supervisors within the organization.

3. The method of claim 1, further comprising monitoring access to the user interface to determine whether the supervisor accesses the information within the subset of information categories on the user interface.

4. The method of claim 1, wherein the stored documents are stored in a private data repository associated with the organization.

5. The method of claim 1, wherein the stored documents are generated one or more persons within the organization having specialized knowledge associated with one or more of the information categories with the set of information categories.

6. The method of claim 1, wherein the electronic mail message includes a second link to a survey for improving the method of claim 1.

7. The method of claim 1, wherein the set of information categories comprises at least two or more from a list that includes: Safety and Inspection, KSM and Productivity, Documentation and Training, Products and Services, and Talking Points.

8. The method of claim 1, wherein the electronic mail message is generated and transmitted on a monthly basis.

9. The method of claim 1, wherein the electronic mail message may indicate that there is no new material within one or more information categories within the subset of information categories associated with the supervisor.

10. An information distribution data processing system comprising:

a communication interface for sending and receiving data over a network;

a memory component for storing computer executable instructions;

a processing unit for executing the computer executable instructions to:

generate a user interface that contains a set of information categories, the set of information categories containing hyperlinks to stored documents containing information that is distributed to supervisors within the organization;

determine the information that is to be dispersed within the set of information categories to a supervisor based on a practice group associated with the supervisor;

generate an electronic mail message that highlights the determined information within the set of information categories, the electronic mail message including a hyperlink to the user interface that contains the set of information categories; and transmit the electronic mail message to the supervisor notifying the supervisor of the determined information within the set of information categories that is to be distributed by the supervisor to supervised employees.

11. The information distribution data processing system of claim 10, wherein the processing unit further executes the computer executable instructions to enable access to the user interface to only the supervisors within the organization and other authorized personnel.

12. The information distribution data processing system of claim 10, wherein the processing unit further executes the computer executable instructions to monitor access to the user interface to determine whether the supervisor accesses the determined information within the set of information categories on the user interface.

13. The information distribution data processing system of claim 10, wherein the electronic mail message includes a link to the user interface.

14. The information distribution data processing system of claim 10, wherein the processing unit further executes the computer executable instructions to generate a report that contains a list of supervisors that have not accessed the determined information on the user interface.

15. The information distribution data processing system of claim 10, wherein the processing unit further executes the computer executable instructions to retrieve the determined information from a data repository associated with the organization.

16. The information distribution data processing system of claim 10, wherein the processing unit further executes the computer executable instructions to receive the determined information from one or more person within the organization having specialized knowledge associated with one or more of the information categories.

17. The information distribution data processing system of claim 10, wherein the processing unit further executes the computer executable instructions to automatically generate a new electronic mail message and transmit the new electronic mail message to the supervisors on a month basis.

* * * * *